United States Patent Office 3,007,862
Patented Nov. 7, 1961

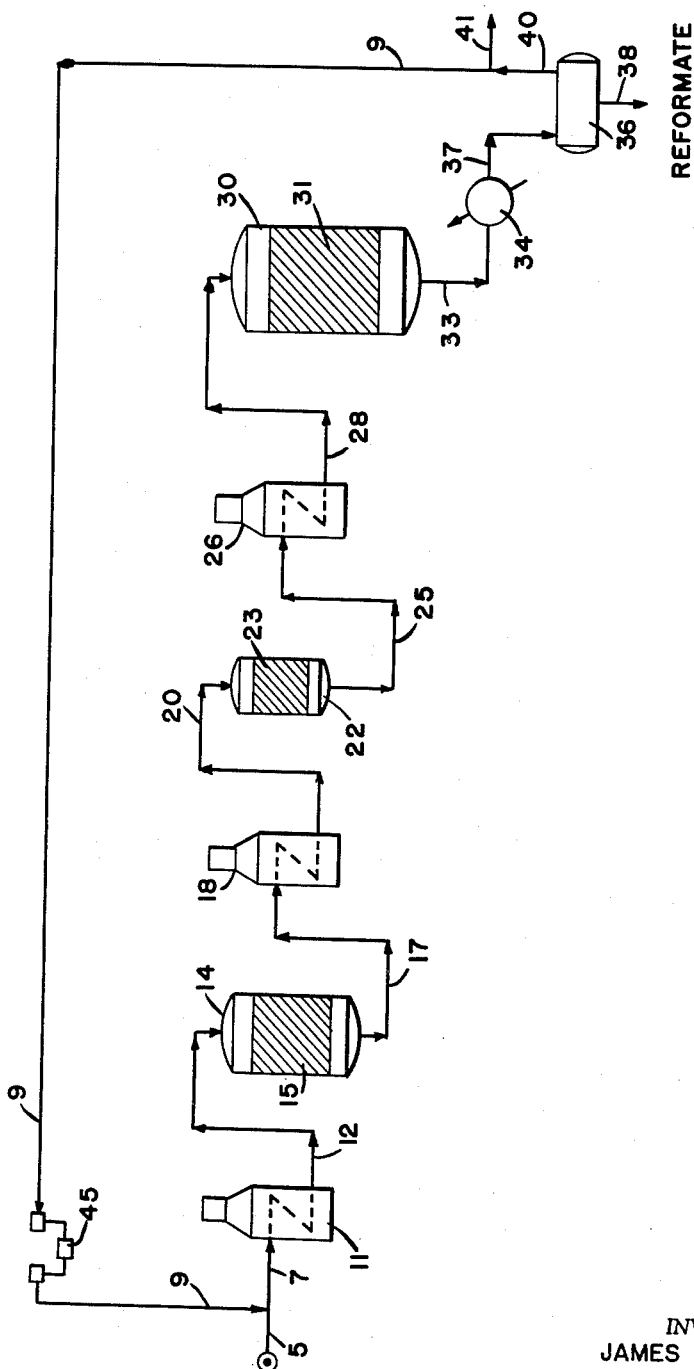
Nov. 7, 1961  J. L. PATTON ET AL  3,007,862
HYDROCARBON CONVERSION SYSTEM
Filed Sept. 17, 1958
INVENTORS.
JAMES L. PATTON
GEORGE W. STANFORD
CHARLES BEDNARS
BY
ATTORNEYS.

3,007,862
HYDROCARBON CONVERSION SYSTEM
James L. Patton, Ramsey, and George W. Stanford, Linden, N.J., and Charles Bednars, Port Washington, N.Y., assignors to The M. W. Kellogg Company, Jersey City, N.J., a corporation of Delaware
Filed Sept. 17, 1958, Ser. No. 761,518
12 Claims. (Cl. 208—65)

This invention relates to an improved reforming process, and more particularly, it pertains to a hydroforming process for light hydrocarbon oils utilizing a platinum catalyst whereby maximum catalyst efficiency is obtained.

An object of this invention is to provide an improved reforming process.

Another object of this invention is to provide a platinum hydroforming process for the treatment of light hydrocarbon oils whereby maximum catalyst utilization is obtained and the catalyst is proportioned in a series of beds to provide for efficient operation.

Other objects and advantages of this invention will become apparent from the following description and explanation thereof.

Broadly, the present invention is concerned with a reforming process which comprises passing a light hydrocarbon oil sequentially through at least two separate beds of platinum catalyst maintained under suitable reforming conditions, the first of said beds containing a greater volume of platinum catalyst than the second bed, and thereafter passing the reactant through at least one more bed of platinum catalyst under suitable reforming conditions.

The light hydrocarbon oil to be used as feed material can be gasoline, naphtha or kerosene. Frequently, the feed material is a naphtha fraction which has an initial boiling point of about 85° to about 230° F., and an end point of about 220° to about 450° F. From the standpoint of obtaining long catalyst life, it is preferred that the naphtha fraction have an initial boiling point of about 190° to about 220° F., and an end point of about 375° to about 400° F. The feed material can be derived from crude oil in the virgin state or from a cracking operation which has been operated catalytically or thermally or the feed material can be a mixture of straight run and cracked naphthas. Since the presence of olefins in the feed material tends to deactivate a platinum catalyst, it is desirable that the feed material be substantially a straight run fraction; and in the case that it is desired to employ the catalyst for an appreciable period of time. A cracked stock can be further treated by means of a hydrogenation catalyst to reduce the olefin concentration to not more than about 2 mol percent, preferably producing a hydrogenated product substantially free of olefins. By virtue of the various sources from which the naphtha fraction is obtained, it can have a Watson characterization factor of about 11.50 to about 12.20. Similarly, the sulfur concentration of the feed material may vary considerably depending upon the source from which it is obtained, however, in order to reduce the loss of catalytic activity by the presence of sulfur, it is desirable that the sulfur concentration be not more than about 0.05% by weight, more usually, not more than about 0.03% by weight, based on the total feed. In case the feed material contains more sulfur than is desired from the standpoint of optimum performance, the feed material can be pretreated by means of a hydrogenation or desulfurization catalyst in the presence of hydrogen in order to convert the same to hydrogen sulfide.

The catalyst to be used for the reforming operation comprises any suitable platinum catalyst possessing hydrogenation-dehydrogenation properties. In this respect, the precursor compound for the catalyst can be an ammine complex, platinum sulfide, chloroplatinic acid, etc. The precursor compound is combined with a suitable carrier material in a manner well-known to those skilled in the art and treated to produce a platinum residue on the carrier material. The carrier material can be, for example, activated charcoal, silica-alumina, alumina, alumina-boria, pumice, kieselguhr, zinc aluminate, spinel, etc. The platinum concentration of the catalyst is about 0.01 to about 10% by weight, preferably about 0.1 to about 2% by weight, based on the total catalyst. The catalyst can also be promoted with combined halogen, e.g., fluorine, chlorine, etc., in an amount of about 0.1 to 10% by weight.

The light hydrocarbon oil is contacted with a platinum catalyst under conditions providing for either a regenerative or non-regenerative operation. The non-regenerative operation is one which functions for a period of at least 1000 hours or at least 1500 to at least 2000 hours before requiring regeneration of the catalyst. Usually the catalyst is regenerated when it acquires a carbon content of about 2 to about 15% by weight, based on the total material. The non-regenerative operation is effected by employing a pressure of greater than 320 p.s.i.g. and up to about 1500 p.s.i.g., more usually, in the range of about 330 to about 750 p.s.i.g. The average temperature at which the reaction occurs is about 700° to about 975° F., preferably about 750° to about 950° F. The quantity of oil being processed relative to the quantity of catalyst which is present in the reaction zone is measured on the basis of the weight space velocity, that is, the pounds of oil per hour charged to the reaction zone per pound of catalyst present therein. The weight space velocity is about 0.5 to about 30. The reforming reaction is effected in the presence of hydrogen in the amount of about 750 to about 15,000, more usually, about 1500 to about 7500, standard cubic feet (measured at 760 mm. Hg and 60° F.) per barrel of oil feed, abbreviated as "s.c.f.b."

In the case of operating the catalyst as a regenerative system, the catalyst requires regeneration when it has acquired the carbonaceous content specified above and this will happen after the catalyst has been used for a period of less than about 1000 hours. For this type of operation, the conditions of treatment are more severe than used for a nonregenerative operation and this can be effected by changing one or more of the variables specified above. In this connection, a higher average temperature can be used, a higher space velocity and/or a lower pressure to accomplish the stated purpose. Accordingly, in a regenerative operation, the average reaction temperature is about 825° to about 1000° F., preferably, about 850° to about 975° F. The weight space velocity is about 0.5 to about 15, more usually, about 1 to about 5. The hydrogen rate to the reaction zone is the same as specified hereinabove for the non-regenerative operation. The perssure of the reaction is less than about 400 p.s.i.g., and, usually, it is in the range of about 100 to about 320 p.s.i.g.

It is noted that the temperature of the reaction has been indicated as an average. In one preferred method of operation, namely, an adiabatic system, the endothermic heat of reaction will cause the temperature of the reactant to drop or decrease as the reactant material passes through the bed of catalytic material. In this connection, it is intended to use the arithmetic average in determining the average temperature for the particular bed of catalyst. By virtue of the endothermic nature of the reaction, the present invention is accomplished by reheating the reactants between catalyst beds. In this manner, the heat of reaction is supplied to the reactant material between the stages of reaction and thus effecting the reaction at a higher average temperature than if the reactants were to proceed through the plurality of reaction zones without suitable preheat. In the first stage or catalyst zone of the reforming operation, the primary reactions are the dehydrogenation of $C_6$ ring naphthenes and, to a lesser extent, the isomerization of $C_5$ ring naphthenes to $C_6$ ring naphthenes and subsequent dehydrogenation. The dehydrogenation of $C_6$ ring naphthenic compounds takes place readily and since this reaction is highly endothermic, the temperature in the first bed or stage drops considerably. In order to effect maximum utilization of the catalyst so that the dehydrogenation reaction takes place at a higher reaction temperature, it is desirable to introduce the reactant material at a high temperature to provide sensible heat for the reaction. For this purpose, the feed material to the first catalyst bed is introduced at a temperature of about 850° to about 1000° F., preferably at a temperature of about 890° to about 975° F. This inlet temperature is about 20° to about 100° greater than the temperature used in the second catalyst zone. By using a high temperature for the feed material which is introduced into the first catalyst zone, the carbon deposition is greater in this zone than in the second zone. The use of high temperature lends to thermal cracking effects and thus the amount of carbon and normally gaseous material produced is higher than in the case of using a lower temperature. Since the heat requirement of the first catalyst zone is high, the inlet temperature of the feed thereto is high, and the increase in carbon deposition is off-set by employing a greater volume of platinum catalyst in the first catalyst zone than in the second catalyst zone. In this manner, the catalyst bed in the first zone will require regeneration at substantially the same time or reasonably close in time as the catalyst in the second zone and, therefore, premature regeneration of one of the catalyst beds is avoided.

In the second catalyst zone, the reforming reaction taking place comprises mainly the completion of the dehydrogenation of $C_6$ ring naphthenes and, to a greater extent, the isomerization of $C_5$ ring naphthenes and subsequent dehydrogenation. Since the preponderance of $C_6$ ring naphthene conversion through dehydrogenation is effected predominantly in the first reaction zone, the heat requirement of the second reaction zone is less than in the first catalyst zone because naphtha feeds inherently contain a greater quantity of $C_6$ ring naphthenes than $C_5$ ring naphthenes. Therefore, the inlet temperature of the feed material to the second reaction zone is about 825° to about 960° F., preferably about 875° to about 950° F. By using a lower feed temperature for the second catalyst zone in conjunction with using a smaller volume of platinum catalyst therein, the time for regeneration is substantially the same or reasonably close to the time for regenerating the first catalyst bed.

With regard to the catalyst being used in the first and second zones, it is important that the volume of catalyst contained in the first catalyst bed be between about 1.1 to about 3 times, preferably about 1.15 to about 1.5 times, greater than the volume of catalyst in the second zone. It should be noted that the platinum concentration of the catalyst in the two zones may vary within the previously defined limits of platinum concentration. Thus, catalyst in the first zone may contain a higher concentration of platinum than the catalyst in the second zone or the catalyst in the second zone may contain a higher platinum concentration. In addition, different type catalysts may be used in the different zones. For example, the catalyst in one zone may be prepared using platinum sulfide as a precursor material whereas the catalyst in another zone may be prepared from chloroplatinic acid. The catalyst in one zone may be promoted, for example, with halogen, whereas the catalyst in another zone may not contain a promoter. In the preferred method of operation the same catalyst is used in each of the zones.

Following the treatment of the reactant material in the first and second catalyst zones, the material is reheated and further contacted with at least one more catalyst bed. The entire reforming system may comprise three or four reactors containing a corresponding number of catalyst beds. Usually, the system will be operated with three catalyst beds. The third catalyst bed will be operated under substantially more severe conditions in order to effect dehydrocyclization of straight chain hydrocarbons to aromatics and hydrocracking of high boiling materials to lower boiling valuable gasoline components. Consequently, the third catalyst bed, with or without additional catalyst beds, can be operated under conditions providing a non-regenerative or regenerative operation using the conditions specified hereinabove in connection with the first and second catalyst zones. From the standpoint of catalyst utilization, it is preferred to employ in the third or subsequent catalyst zone a greater volume of supported platinum catalyst than in either preceding catalyst zones and preferably greater than the combined quantity of supported platinum catalyst in the preceding catalyst zones. Similarly, as in the case of the first and second catalyst zones, the composition of the catalyst, i.e., the platinum precursor, the platinum concentration, the presence of promoters, etc., may be varied although it is preferred that the same catalyst be used in the third zone as in the first two zones. The volume of supported platinum catalyst in the third catalyst zone, or in the subsequent catalyst zones following the first and second zones, is more than one and up to about 20 times, preferably about 2 to about 10 times, the volume of supported platinum catalyst in either the first or second catalyst zones, and preferably about 0.85 to about 10 times, more usually about 1.2 to about 5 times, the combined volume of supported platinum catalyst in the first and second zones. The reactant material leaving the second catalyst zone is preheated to a temperature of about 825° to about 950° F., more usually, about 840° to about 940° F., before it is charged to the third or subsequent catalyst zones. The catalyst in the third catalyst zone or in the subsequent catalyst zones is regenerated when it has acquired a carbonaceous content of about 2 to about 15%, based on the total catalyst.

The regeneration of catalyst in our system is effected by passing an oxygen containing gas, e.g., air or diluted air containing about 1 to about 10 mol percent of oxygen, at a temperature of about 550° to about 1000° F., more usually, about 600° to about 900° F. The pressure of regeneration can be at atmospheric level or superatmospheric level, for example, ranging from about atmospheric pressure to about 750 p.s.i.g. Following the regeneration treatment of the catalyst for the removal of carbonaceous material, the catalyst can be subjected to a severe temperature by means of an oxygen containing gas having an oxygen partial pressure of at least 14.7 p.s.i.a., more usually, in the range of about 20 to about 200 p.s.i.a., and at a temperature of about 900° to about 1200° F., more usually, about 950° to about 1050° F. and for a period of about 0.10 to about 25 hours, more usually, about 0.5 to about 7 hours.

In order to provide a better understanding of this invention, reference will be had to a specific example shown in the accompanying drawing which forms a part of this specification.

Naphtha feed is supplied through line 5 at the rate of 3218 barrels per day. This naphtha has an API gravity of 55.4°, a sulfur concentration of 0.01% by weight, an initial boiling point of 220° F. and an end point of about 400° F. The naphtha feed is combined with recycle gas containing about 90% by volume of hydrogen in line 7 and the recycle gas is supplied thereto by means of line 9. The recycle gas has a molecular weight of 11.0, and it is fed to line 7 at the rate of 18,127 pounds per hour. The total reactant material of naphtha and recycle gas is fed to a furnace 11 wherein the temperature is heated to 950° F. The heated reactants are discharged from furnace 11 by means of line 12, and thence, they are fed to the top of a reactor 14. Reactor 14 contains platinum catalyst having 0.60% by weight of platinum supported on alumina. The total quantity of platinum catalyst in reactor 14 is 2.25 tons and it occupies a zone 15 of 107 cubic feet. The pressure in reactor 14 is about 515 p.s.i.g. and the quantity of catalyst provides a weight space velocity of about 7.42. As a result of the endothermic reactions taking place in reactor 14, the material is discharged from the bottom thereof by means of line 17 at a temperature of 810° F. The effluent from reactor 14 is preheated by means of furnace 18 to a temperature of 925° F. The preheated effluent is discharged from furnace 18 by means of line 20 and it is fed to the top of a second reactor 22. Reactor 22 contains platinum catalyst having a platinum concentration of 0.6% by weight supported on alumina. The catalyst occupies a zone 23 of 88 cubic feet, and the total catalyst weighs about 1.85 tons. The pressure in reactor 22 is about 490 p.s.i.g. The quantity of reactants flowing therethrough provides a weight space velocity of 9.1. As a result of the endothermic heat of reaction in reactor 22, the effluent is discharged from the bottom thereof by means of line 25 at a temperature of 885° F. It is to be noted that a greater quantity of catalyst or platinum is employed in the first reactor 14 than in the second reactor 22. A higher inlet temperature of the feed material to reactor 14 is used than the inlet temperature to reactor 22.

The effluent from reactor 22 passes from line 25 to a second furnace 26. The effluent in furnace 26 is heated to a temperature of 915° F. and thence, it is discharged therefrom by means of line 28. The heated material is passed from line 28 to the top of a third reactor 30. Reactor 30 contains platinum catalyst having a platinum concentration of 0.6% by weight supported on alumina. The catalyst occupies a zone 31 of 188 cubic feet. The total quantity of 3.96 tons and it provides a weight space velocity of 4.25. The pressure in reactor 30 is 465 p.s.i.g. The effluent material from the reactor 30 is discharged from the bottom thereof by means of line 33. The reaction product is passed through a cooler 34 wherein the temperature is reduced to 100° F. at a pressure of about 435 p.s.i.g. The cooled reaction product is passed from cooler 34 to a separator 36 by means of line 37. The temperature and pressure in separator 36 is 100° F. and 435 p.s.i.g. The normally liquid product is discharged from the bottom of the separator by means of line 38. The normally gaseous product material containing hydrogen is discharged from the top of separator 36 by means of line 40. As a result of the reforming operation, there is a net production of gas. The net production of gas is yielded from the system by means of line 41 at the rate of 3511 pounds per hour. The remaining portion of normally gaseous product material, also known as recycle gas, is returned to the reforming system by means of line 9. The recycle gas is compressed by means of compressor 45 prior to being passed into line 7 previously mentioned.

This application is a continuation-in-part of our prior and co-pending application Serial No. 471,650, filed November 29, 1954, now abandoned.

Having thus provided a description of this invention by reference to a specific example thereof, it should be understood that no undue limitations or restrictions are to be imposed by reason thereof, but that the scope of this invention is defined by the appended claims.

We claim:

1. A reforming process which comprises passing a light hydrocarbon oil sequentially through two separate fixed beds of supported platinum catalyst under suitable reforming conditions, the first of said beds containing a quantity of platinum catalyst between about 1.1 and about 3 times by volume greater than the second bed and then passing the product from the second catalyst bed through at least one more fixed catalyst bed containing a supported platinum catalyst under suitable reforming conditions to produce a gasoline product of high anti-knock quality.

2. A reforming process which comprises passing a light hydrocarbon oil sequentially through two separate fixed beds of supported platinum catalyst under adiabatic reforming conditions selected to provide a non-regenerative operation, the first of said beds containing a quantity of platinum catalyst between about 1.1 and about 3 times by volume greater than the second bed, and contacting the product from the second catalyst bed with at least one more fixed catalyst bed maintained under adiabatic reforming conditions which are selected to provide a non-regenerative operation and thereby produce a gasoline product of high anti-knock quality.

3. A reforming process which comprises passing a light hydrocarbon oil sequentially through two separate fixed beds of supported platinum catalyst maintained under adiabatic reforming conditions, the first of said beds containing a quantity of platinum catalyst between about 1.1 and about 3 times by volume greater than the second bed, and passing the product from the second catalyst bed to a third fixed catalyst bed maintained under adiabatic reforming conditions, said third catalyst bed containing a greater quantity by volume of platinum catalyst than each of the preceding catalyst beds.

4. A reforming process which comprises passing a light hydrocarbon oil sequentially through two separate fixed beds of supported platinum catalyst maintained under adiabatic conditions, the first of said beds containing a quantity of platinum catalyst between about 1.1 and about 3 times by volume greater than the second bed, and passing the product from the second catalyst bed to a third catalyst bed maintained under adiabatic reforming conditions, said third fixed bed containing a quantity of platinum catalyst which is greater by volume than the combined quantity of platinum catalyst in the first and second catalyst beds.

5. A reforming process which comprises passing a light hydrocarbon oil reactant at a temperature of about 850° F. to about 1000° F. to a first catalyst zone containing a fixed bed of supported platinum catalyst under reforming conditions, removing the reactant from the first catalyst bed and heating the same to a temperature of about 825° F. to about 960° F., passing the heated reactant to a second catalyst zone containing a fixed bed of supported platinum catalyst under reforming conditions, the temperature of the reactant which is passed to the first catalyst zone is about 20° to about 100° F. greater than the reactant which is passed to the second catalyst zone, the total quantity of platinum catalyst in the first catalyst zone being about 1.1 to 3 times by volume as much as the quantity of platinum catalyst in the second catalyst zone and passing the reactant from the second catalyst zone to a third catalyst zone containing a fixed bed of supported platinum catalyst at a temperature of about 850° F. to about 950° F. and the quantity of platinum catalyst in the third catalyst zone is greater by volume than the quantity of platinum catalyst in each of the preceding catalyst zones.

6. A reforming process which comprises passing a light hydrocarbon oil sequentially through two separate fixed beds of supported platinum catalyst under suitable reforming conditions, the first of said beds containing a quantity of platinum catalyst between about 1.1 and about 3 times by volume greater than the second bed, the temperature of the light hydrocarbon oil being fed to the first bed is greater than the temperature of the feed material to the second bed, and then passing the product from the second catalyst bed through at least one more fixed catalyst bed containing platinum supported on a carrier under suitable reforming conditions to produce a gasoline product of high anti-knock quality.

7. The process of claim 1 wherein the first bed contains about 1.15 to about 1.5 times by volume as much platinum catalyst as the second bed.

8. The process of claim 3 wherein the third bed contains about 0.85 to about 10 times by volume as much platinum catalyst as the combined quantities of platinum catalyst in the first and second catalyst beds.

9. The process of claim 3 wherein the third bed contains about 1 to about 20 times by volume as much platinum catalyst as the catalyst in each of the preceding catalyst beds.

10. A process which comprises passing a light hydrocarbon reactant at a temperature of about 890° F. to about 975° F. to a first catalyst zone containing a fixed bed of supported platinum catalyst under reforming conditions, removing the reactant from the first catalyst bed and heating the same to a temperature of about 875° F. to about 950° F., passing the heated reactant to a second catalyst zone containing a fixed bed of supported platinum catalyst under reforming conditions, the temperature of the reactant which is passed to the first catalyst zone is about 20° F. to about 100° F. greater than the reactant which is passed to the second catalyst zone, the total quantity of platinum catalyst in the first catalyst zone is about 1.15 to about 1.5 times by volume as much as the quantity of platinum catalyst in the second catalyst zone, and passing the reactant from the second catalyst zone to a third catalyst zone containing a fixed bed of supported platinum catalyst at a temperature of about 850° F. to about 950° F., the quantity of platinum catalyst in the third catalyst zone being greater by volume than the quantity of platinum catalyst in each of the preceding catalyst zones.

11. A reforming process which comprises passing a light hydrocarbon oil sequentially through two separate fixed beds of supported platinum catalyst under suitable reforming conditions, said platinum catalyst in each bed being effective for reforming naphtha at the existing conditions in each bed, the first of said beds containing a quantity of platinum catalyst between about 1.1 and about 3 times by volume greater than the second bed and then passing the product from the second catalyst bed through at least one more fixed catalyst bed containing supported platinum catalyst under suitable reforming conditions to produce a gasoline product of high anti-knock quality.

12. A reforming process which comprises passing a light hydrocarbon oil sequentially through two separate fixed beds of supported platinum catalyst of substantially the same composition under suitable reforming conditions, the first of said beds containing a quantity of platinum catalyst between about 1.1 and about 3 times by volume greater than the second bed and then passing the product from the second catalyst bed through at least one more fixed catalyst bed containing platinum supported on a carrier under suitable reforming conditions to produce a gasoline product of high anti-knock quality and reheating reactant between beds.

References Cited in the file of this patent

UNITED STATES PATENTS

| | | |
|---|---|---|
| 2,654,694 | Berger et al. | Oct. 6, 1953 |
| 2,710,827 | Gornowski | June 14, 1955 |
| 2,781,298 | Haensel et al. | Feb. 12, 1957 |
| 2,861,942 | Beckberger | Nov. 25, 1958 |